US010253158B2

(12) United States Patent
Kim et al.

(10) Patent No.: US 10,253,158 B2
(45) Date of Patent: *Apr. 9, 2019

(54) METHOD FOR CONTINUOUSLY PREPARING MODIFIED CONJUGATED DIENE POLYMERS, POLYMERS OBTAINED FROM THE METHOD, AND RUBBER COMPOSITION COMPRISING THE SAME

(71) Applicant: LG CHEM, LTD., Seoul (KR)

(72) Inventors: Jin Young Kim, Daejeon (KR); Ro Mi Lee, Daejeon (KR); Sang Mi Lee, Daejeon (KR); Heung Yeal Choi, Daejeon (KR); Moon Seok Chun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 141 days.

This patent is subject to a terminal disclaimer.

(21) Appl. No.: 14/391,303

(22) PCT Filed: Mar. 27, 2014

(86) PCT No.: PCT/KR2014/002624
§ 371 (c)(1),
(2) Date: Oct. 8, 2014

(87) PCT Pub. No.: WO2014/175562
PCT Pub. Date: Oct. 30, 2014

(65) Prior Publication Data
US 2016/0053059 A1 Feb. 25, 2016

(30) Foreign Application Priority Data

Apr. 25, 2013 (KR) .................. 10-2013-0045823
Jul. 29, 2013 (KR) .................. 10-2013-0089221

(51) Int. Cl.
C08J 3/24 (2006.01)
C08K 3/36 (2006.01)

(52) U.S. Cl.
CPC .................... C08K 3/36 (2013.01)

(58) Field of Classification Search
CPC ...... C08J 2325/10; C08F 36/06; C08L 101/10
See application file for complete search history.

(56) References Cited

U.S. PATENT DOCUMENTS

| 8,800,621 | B2 | 8/2014 | Miyazaki | |
| 9,290,585 | B2* | 3/2016 | Lee | C08F 236/10 |
| 2010/0099795 | A1* | 4/2010 | Uesaka | B60C 1/0016 |
| | | | | 523/152 |
| 2012/0277369 | A1* | 11/2012 | Yoshida | C08C 19/44 |
| | | | | 524/575 |
| 2013/0023623 | A1* | 1/2013 | Nakamura | B60C 1/00 |
| | | | | 524/572 |

FOREIGN PATENT DOCUMENTS

| CN | 101735498 | A | | 6/2010 |
| CN | 102781968 | A | | 11/2012 |
| JP | 2006-257260 | A | | 9/2006 |
| JP | 2006-257261 | A | | 9/2006 |
| JP | 2008285558 | A | | 11/2008 |
| JP | 2009242788 | A | | 10/2009 |
| JP | 2010111753 | A | | 5/2010 |
| JP | 2010116545 | A | | 5/2010 |
| JP | 2010116546 | A | | 5/2010 |
| JP | 2011116823 | A | | 6/2011 |
| JP | 2011195802 | A | | 6/2011 |
| JP | 2011132298 | A | | 7/2011 |
| JP | 2013082840 | A | | 5/2013 |
| WO | 2007114203 | A1 | | 10/2007 |
| WO | 2011040312 | | * | 4/2011 |
| WO | 2011125698 | | * | 10/2011 |
| WO | 2011125698 | A1 | | 10/2011 |
| WO | 2013027814 | A1 | | 2/2013 |

OTHER PUBLICATIONS

Odian (Principle of Polymerization, Wiley-Interscience, 1981, pp. 388-389).*
Odian (Principles of Polymerization, 4th Ed. Wiley-Interscience, 2004, p. 428).*

* cited by examiner

*Primary Examiner* — Kuo Liang Peng
(74) *Attorney, Agent, or Firm* — Dentons US LLP

(57) ABSTRACT

Disclosed are a method for continuously preparing a modified conjugated diene polymer, a polymer obtained by the method and a rubber composition comprising the same. Advantageously, provided is a method for continuously preparing a modified conjugated diene polymer which has a high molecular weight and exhibits superior processability due to control of molecular weight distribution (polydispersity).

5 Claims, No Drawings

METHOD FOR CONTINUOUSLY PREPARING MODIFIED CONJUGATED DIENE POLYMERS, POLYMERS OBTAINED FROM THE METHOD, AND RUBBER COMPOSITION COMPRISING THE SAME

This application is a 35 USC § 371 National Stage entry of International Application No. PCT/KR2014/002624, filed on Mar. 27, 2014, and claims priority of Korean Application Nos. KR 10-2013-0045823, filed Apr. 25, 2013, and KR 10-2013-0089221, filed Jul. 29, 2013, which are each hereby incorporated by reference in their entirety.

TECHNICAL FIELD

The present invention relates to a method for continuously preparing a modified conjugated diene polymer, a polymer obtained by the method and a rubber composition comprising the same. The present invention relates to a method for continuously preparing a modified conjugated diene polymer which has a high molecular weight and exhibits superior processability due to control of molecular weight distribution (polydispersity), a polymer obtained by the method and a rubber composition comprising the same.

BACKGROUND ART

Demands for stability, durability and low fuel consumption of vehicles are increasing. Accordingly, there is an increasing demand for rubbers exhibiting excellent wet skid resistance and mechanical strength, and low rolling resistance as materials for vehicle tires, in particular, tire treads contacting the roads.

Conventional tire treads have been produced using a conjugated diene rubber in conjunction with an inorganic filler in order to reinforce the properties described above, but have problems of great hysteresis loss or low dispersibility.

DISCLOSURE

Technical Problem

Therefore, the present invention has been made in view of the above problems, and it is one object of the present invention to provide a method for continuously preparing a modified conjugated diene polymer which has a high molecular weight and exhibits superior processability due to control of molecular weight distribution (polydispersity).

It is another object of the present invention to provide a modified conjugated diene polymer obtained by the method, a rubber composition comprising the same and a tire comprising the rubber composition.

The above and other objects can be accomplished by the present disclosure given below.

Technical Solution

In accordance with one aspect of the present invention, the invention provides a method for continuously preparing a modified conjugated diene polymer, the method comprising (a) polymerizing a conjugated diene monomer, or the conjugated diene monomer and an aromatic vinyl monomer using an organometallic compound in the presence of a solvent to prepare an active polymer having a metal end group, and (b) modifying the active polymer by adding a compound represented by the following Formula 1:

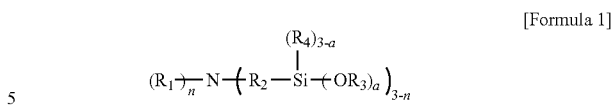

[Formula 1]

wherein $R_1$ is an alkyl group or an alkylsilyl group, $R_2$ is an alkyl group or an alkylene group, $R_3$ and $R_4$ are alkyl group, a is an integer of 1 to 3 and n is an integer of 0 to 2, wherein two $R_1$ bonded to nitrogen are identical or different when n is 2, and similarly, corresponding groups are identical or different when 3−n is 2 or more.

In accordance with another aspect of the present invention, provided is a modified conjugated diene polymer prepared by the method described above and represented by Formula 2 below:

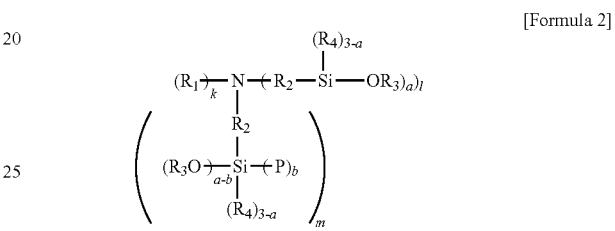

[Formula 2]

wherein $R_1$ is an alkyl group or an alkylsilyl group, $R_2$ is an alkyl group or an alkylene group, $R_3$ and $R_4$ are alkyl group, a is an integer of 1 to 3, l and k are integer of 0 to 2, m is an integer of 1 to 3, l+k+m satisfies 3, p is a conjugated diene polymer chain and b is an integer of 1 to 3, wherein two $R_1$ bonded to nitrogen are identical or different when k is 2, and similarly, corresponding groups are identical or different when l and m are 2 or more.

In accordance with another aspect of the present invention, the invention provides a modified conjugated diene polymer rubber composition comprising 0.1 to 200 parts by weight of an inorganic filler with respect to 100 parts by weight of the modified conjugated diene polymer.

In accordance with another aspect of the present invention, the invention provides a tire comprising the modified conjugated diene polymer rubber composition.

Advantageous Effects

As apparent from the fore-going, the present invention advantageously provides a method for continuously preparing a modified conjugated diene polymer which has a high molecular weight and exhibits superior processability due to control of molecular weight distribution (polydispersity), a polymer obtained by the method and a rubber composition comprising the same.

BEST MODE

Hereinafter, the method for continuously preparing a modified conjugated diene polymer, the modified conjugated diene polymer obtained by the method, the rubber composition comprising the same and the like will be described in detail.

The method for continuously preparing a modified conjugated diene polymer according to the present invention includes (a) polymerizing a conjugated diene monomer, or the conjugated diene monomer and an aromatic vinyl monomer using an organometallic compound in the presence of a solvent to prepare an active polymer having a metal end group, and (b) modifying the active polymer by adding a compound represented by the following Formula 1:

[Formula 1]

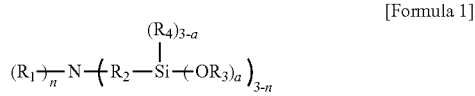

wherein $R_1$ is an alkyl group or an alkylsilyl group, $R_2$ is an alkyl group or an alkylene group, $R_3$ and $R_4$ are alkyl group, a is an integer of 1 to 3, and n is an integer of 0 to 2, wherein two $R_1$ bonded to nitrogen are identical or different when n is 2, and similarly, corresponding groups are identical or different when 3−n is 2 or more.

For example, the compound may be bis(methyldimethoxysilylpropyl)-N-methylamine, bis(trimethoxysilylpropyl)-N-methylamine, bis(diethoxymethylsilylpropyl)-N-methylamine, or diethylaminopropyltrimethoxysilane.

The conjugated diene monomer, for example, comprises at least one selected from the group consisting of 1,3-butadiene, 2,3-dimethyl-1,3-butadiene, piperylene, 3-butyl-1,3-octadiene, isoprene, and 2-phenyl-1,3-butadiene.

The aromatic vinyl monomer, for example, comprises at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene. In another example, the aromatic vinyl monomer is styrene or α-methylstyrene.

The aromatic vinyl monomer may be present in an amount of 0.0001 to 50% by weight, 10 to 40% by weight or 20 to 40% by weight, based on total 100% by weight of the conjugated diene monomer and the aromatic vinyl monomer.

The solvent may for example comprise hydrocarbons, or at least one selected from the group consisting of n-pentane, n-hexane, n-heptane, isooctane, cyclohexane, toluene, benzene and xylene.

The organometallic compound may for example comprise organic alkali metal compounds or at least one selected from the group consisting of organolithium compounds, organosodium compounds, organopotassium compounds, organorubidium compounds and organocesium compounds.

In another example, the organometallic compound may comprise at least one selected from the group consisting of methyl lithium, ethyl lithium, isopropyl lithium, n-butyl lithium, sec-butyl lithium, tert-butyl lithium, n-decyl lithium, tert-octyl lithium, phenyl lithium, 1-naphthyl lithium, n-eicosyl lithium, 4-butylphenyl lithium, 4-tolyl lithium, cyclohexyl lithium, 3,5-di-n-heptylcyclohexyl lithium and 4-cyclopentyl lithium.

In another example, the organometallic compound is n-butyl lithium, sec-butyl lithium or a mixture thereof.

In another example, the organometallic compound may comprise at least one selected from the group consisting of naphthyl sodium, naphthyl potassium, lithium alkoxide, sodium alkoxide, potassium alkoxide, lithium sulfonate, sodium sulfonate, potassium sulfonate, lithium amide, sodium amide and potassium amide and may be used in combination with another organometallic compound.

The organometallic compound is for example used in an amount of 0.01 to 10 mmol, 0.05 to 5 mmol, 0.1 to 2 mmol or 0.1 to 1 mmol, based on total 100 g of the monomer.

A molar ratio of the organometallic compound to the compound represented by Formula 1 is for example 1:0.1 to 1:10, or 1:0.5 to 1:2.

The active polymer having a metal end group means a polymer wherein a polymer anion is bonded to a metal cation.

The method for preparing a modified conjugated diene polymer according to the present invention, for example, further comprises adding a polar additive during (a) the polymerization.

The polar additive is for example a base. In another example, the polar additive is ether, amine or a mixture thereof, or is selected from the group consisting of tetrahydrofuran, ditetrahydropropylpropane, diethylether, cyclopentylether, dipropyl ether, ethylene glycol diethyl ether, ethylene glycol dimethyl ether, diethylene glycol dimethyl ether, tertiary butoxyethoxyethane bis(2-dimethylaminoethyl)ether, (dimethylaminoethyl)ethylether, trimethylamine, triethylamine, tripropylamine, and tetramethylethylenediamine. In another example, the polar additive is ditetrahydropropylpropane, triethylamine or tetramethylethylenediamine.

The polar additive may be for example used in an amount of 0.001 to 50 g, 0.001 to 10 g, 0.005 to 1 g, or 0.005 to 0.1 g, based on total 100 g of the added monomer.

In another example, the polar additive may be used in an amount of 0.001 to 10 g, or 0.005 to 5 g, based on total 1 mmol of the added organometallic compound.

When the conjugated diene monomer and the aromatic vinyl monomer are copolymerized, a block copolymer may be readily prepared due to difference in reaction speed between the monomers. However, when the polar additive is added, reaction speed of the vinyl aromatic compound which has a low reaction speed is increased, and microstructure, for example, random copolymer, of the copolymer corresponding thereto, is advantageously induced.

The polymerization (a) may be for example anionic polymerization.

In another example, the polymerization (a) may be living anionic polymerization providing active ends obtained by growth reaction by anions.

The polymerization (a) may be for example polymerization at an elevated temperature or polymerization at a fixed temperature.

The polymerization at an elevated temperature means a polymerization method which includes elevating a reaction temperature by heating randomly after adding an organometallic compound. The polymerization at a fixed temperature means a polymerization method which does not include heating randomly after adding an organometallic compound.

A temperature of the polymerization (a) is for example −20 to 200° C., 0 to 150° C., or 10 to 120° C.

In the modification (b), for example, one or more compounds, or two or three compounds selected from bis (methyldimethoxysilylpropyl)-N-methylamine, bis (trimethoxysilylpropyl)-N-methylamine, bis (diethoxymethylsilylpropyl)-N-methylamine, and diethylaminopropyltrimethoxysilane may be added.

In addition, the modification (b) may include a reaction, for example, at 0 to 90° C. for one minute to 5 hours.

The method for preparing a modified conjugated diene polymer according to the present invention may be, for example, continuous polymerization including one, two or more reactors.

The modified conjugated diene polymer is prepared by the method described above and is represented by the following Formula 2:

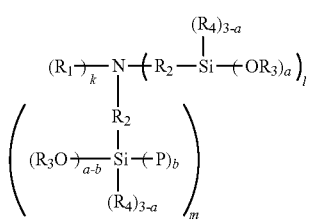

wherein $R_1$ is an alkyl group or an alkylsilyl group, $R_2$ is an alkyl group or an alkylene group, $R_3$ and $R_4$ are alkyl group, a is an integer of 1 to 3, l and k are integer of 0 to 2, m is an integer of 1 to 3, l+k+m satisfies 3, p is a conjugated diene polymer chain and b is an integer of 1 to 3, wherein two or more $R_1$ bonded to nitrogen are identical or different when k is 2 or more, and similarly, corresponding groups are identical or different when l and m are 2 or more.

$R_1$ is for example alkyl group having carbon number of 1 to 12, or alkylsilyl group having carbon number of 1 to 12.

$R_2$ is for example alkyl group having carbon number of 1 to 12, or alkylene group having carbon number of 2 to 13.

$R_3$ and $R_4$ are alkyl group having carbon number of 1 to 12.

l is for example 0 or 1.

k is for example 0 or 1. Within this range, there are advantages in that hysteresis loss is reduced, and compatibility with the inorganic filler, in particular silica, is excellent.

m is for example 1 or 2 and, in another example, m is 2 or 3.

The total number of p is 1 to 9, 1 to 5, or 1 to 3. Within this range, there is an effect in that tires produced using the polymer exhibit superior wet skid resistance and low fuel consumption.

In Formula 2, for example, k is 1, l is 0, and m is 2.

In Formula 2, in another example, k is 1, l is 1, and m is 1.

The conjugated diene polymer chain is for example a chain comprising a conjugated diene monomer alone, or both the conjugated diene monomer and an aromatic vinyl monomer.

In another example, the conjugated diene polymer chain may be a polymer chain comprising 0.0001 to 50% by weight, 10 to 40% by weight or 20 to 40% by weight of the aromatic vinyl monomer, based on total 100% by weight of the conjugated diene monomer and the aromatic vinyl monomer.

The polymer chain comprising the conjugated diene monomer and the aromatic vinyl monomer may be for example a random polymer chain.

The conjugated diene monomer, for example, comprises at least one selected from the group consisting of 1,3-butadiene, 2,3-dimethyl-1,3-butadiene, piperylene, 3-butyl-1,3-octadiene, isoprene, and 2-phenyl-1,3-butadiene.

The aromatic vinyl monomer, for example, comprises at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene. In another example, the aromatic vinyl monomer is styrene or α-methylstyrene.

The modified conjugated diene polymer may, for example, have a PDI of 0.5 to 10, 0.5 to 5, or 1.0 to 4.0.

The modified conjugated diene polymer has, for example, a Mooney viscosity of 30 or higher, or 30 to 110.

In another example, the modified conjugated diene polymer may have a Mooney viscosity of 40 to 100, or 45 to 90.

The modified conjugated diene polymer, for example, has a number average molecular weight (Mn) of 1,000 to 2,000,000 g/mol, 10,000 to 1,000,000 g/mol, or 100,000 to 1,000,000 g/mol.

The conjugated diene polymer, for example, has a vinyl content of 18% or higher, 20% or higher, or 30 to 70%. Within this range, there are advantages in that glass transition temperature of the polymer is increased, properties required for produced tires such as running resistance and brake power, are satisfied and fuel consumption is reduced.

The vinyl content means a content of a unit having a vinyl group, or a content of not 1,4-added but 1,2-added conjugated diene monomer with respect to 100% by weight of the conjugated diene monomer.

Regarding viscoelasticity, the modified conjugated diene polymer, for example, has a Tan δ at 0° C., measured at 10 Hz using DMA after mixing with silica, of 0.4 to 1, or 0.5 to 1. Within this range, there is an effect in that skid resistance or wet skid resistance is greatly improved, as compared to the related art.

In addition, the modified conjugated diene polymer has, for example, a Tan δ at 60° C., of 0.30 to 0.20, or 0.15 to 0.10. Within this range, rolling resistance or rotational resistance (RR) is advantageously greatly improved, as compared to the related art.

The modified conjugated diene polymer rubber composition according to the present invention comprises 100 parts by weight of the modified conjugated diene polymer and 0.1 to 200 parts by weight of an inorganic filler.

The modified conjugated diene polymer rubber composition may further comprise, for example, another conjugated diene polymer.

The another conjugated diene polymer may be, for example, styrene-butadiene rubber (SBR), butadiene rubber (BR), natural rubber or a mixture thereof.

The SBR may be, for example, a solution styrene-butadiene rubber (SSBR).

The modified conjugated diene polymer rubber composition according to the present invention may, for example, comprise 20 to 100 parts by weight of the modified conjugated diene polymer and 0 to 80 parts by weight of the another conjugated diene polymer.

In another example, the modified conjugated diene polymer rubber composition may comprise 20 to 99 parts by weight of the modified conjugated diene polymer and 1 to 80 parts by weight of the another conjugated diene polymer.

In another example, the modified conjugated diene polymer rubber composition may comprise 10 to 100 parts by weight of the modified conjugated diene polymer, 0 to 90 parts by weight of the another conjugated diene polymer, 0 to 100 parts by weight of carbon black, 5 to 200 parts by weight of silica and 2 to 20 parts by weight of a silane coupling agent.

In another example, the modified conjugated diene polymer rubber composition may comprise 10 to 100 parts by weight of the modified conjugated diene polymer, 0 to 90 parts by weight of the another conjugated diene polymer, 0 to 100 parts by weight of carbon black, 5 to 200 parts by weight of silica and 2 to 20 parts by weight of a silane coupling agent, wherein the total weight of the modified conjugated diene polymer and the another conjugated diene polymer is 100 parts by weight.

In another example, the modified conjugated diene polymer rubber composition according to the present invention may comprise 100 parts by weight of a polymer mixture comprising 10 to 99% by weight of the modified conjugated diene polymer and 1 to 90% by weight of the another conjugated diene polymer, 1 to 100 parts by weight of carbon black, 5 to 200 parts by weight of silica and 2 to 20 parts by weight of a silane coupling agent.

The inorganic filler may be present in an amount of, for example, 10 to 150 parts by weight, or 50 to 100 parts by weight.

The inorganic filler may be, for example, carbon black, a silica filler or a mixture thereof.

In another example, the inorganic filler may be silica. In this case, advantageously, dispersibility is greatly improved and hysteresis loss is greatly decreased because an end of the modified conjugated diene polymer is bonded to (or capped with) silica particles.

The modified conjugated diene polymer rubber composition may for example further comprise 1 to 100 parts by weight of an oil.

The oil may be, for example, a mineral oil, a softening agent or the like.

The oil may be, for example, used in an amount of 10 to 100 parts by weight, or 20 to 80 parts by weight, with respect to 100 parts by weight of the conjugated diene copolymer. Within this range, there are effects in that properties are efficiently exhibited, the rubber composition is suitably softened and processability is thus excellent.

The modified conjugated diene polymer rubber composition may be for example used as a material for tires or tire treads.

The tire may be produced from the modified conjugated diene polymer rubber composition.

Hereinafter, preferred examples will be provided for better understanding of the present invention. It will be apparent to those skilled in the art that these examples are only provided to illustrate the present invention and various modifications and alterations are possible within the scope and technical range of the present invention. Such modifications and alterations fall within the scope of claims included herein.

EXAMPLE

Example 1

Among three reactors, first and second reactors were used as polymerization reactors and a third reactor was used as a modification reactor.

Specifically, styrene, 1,3-butadiene and n-hexane from which impurities such as moisture had been removed were mixed before adding at rates of 2.373 kg/h, 3.756 kg/h and 4.086 kg/h, respectively, to the reactors. The mixed solution was continuously added to the first reactor and 2,2-bis(2-oxolanyl)propane and n-butyl lithium were added as polar additives at rates of 4.29 g/h and 22.32 mmol/h to the first reactor and an inner temperature of the reactor was controlled to 80° C.

The polymer of the first reactor was continuously supplied to an upper part of the second reactor and the temperature was maintained at 80° C. The polymer of the second reactor was continuously added to an upper part of the third reactor, bis(diethoxymethylsilylpropyl)-N-methylamine was continuously added at a rate of 10.27 mmol/h and modification reaction was performed. Then, a solution consisting of isopropyl alcohol and an antioxidant (Wingstay-K) at a ratio of 8:2 was added at a rate of 325 g/h to the polymer of the third reactor to stop polymerization.

37.5 phr of a TDAE oil (treated distilled aromatic extract having a glass transition temperature of about −44 to about −50° C.) was mixed with 100 parts by weight of the rubber polymer, the resulting mixture was stirred in warm water heated by steam to remove the solvent, and the resulting solution was then roll-dried to remove the residual solvent and water, thereby preparing a modified conjugated diene polymer. Analysis results of the modified conjugated diene polymer thus prepared are shown in the following Table 1.

Example 2

A modified conjugated diene polymer was prepared in the same manner as in Example 1, except that N,N,N',N'-tetramethylethylenediamine was continuously added at a rate of 3.9 g/h to the first reactor, instead of 2,2-bis(2-oxolanyl)propane as a polar additive. Analysis results of the modified conjugated diene polymer are shown in the following Table 1.

Comparative Example 1

A modified conjugated diene polymer was prepared in the same manner as in Example 2, except that that N,N,N',N'-tetraglycidyl-m-xylenediamine as a coupling agent was added at a rate of 1.41 mmol/h, instead of bis(diethoxymethylsilylpropyl)-N-methlyamine as a modifying agent. Analysis results of the modified conjugated diene polymer are shown in the following Table 1.

Comparative Example 2

Analysis results of a commercially available unmodified conjugated diene polymer (TUFDENE™ 3835, produced by Asahi Kasei Corporation) are shown in the following Table 1. For reference, regarding the unmodified conjugated diene polymer (TUFDENE™ 3835), a RAE oil was used instead of the TDAE oil used in Example 1.

Analysis of the conjugated diene polymers prepared in Examples 1 to 2 and Comparative Examples 1 to 2 was performed in accordance with the following method.

a) Mooney viscosity: measured at 100° C. for 4 minutes using MV-2000 produced by ALPHA Technologies and two specimens having a weight of 15 g or more after pre-heating for one minute.

b) Styrene monomer (SM) and vinyl contents (Vinyl): measured by NMR.

C) Weight average molecular weight (Mw), number average molecular weight (Mn), and polydispersity index (PDI): measured by GPC analysis at 40° C. The column used herein was a combination of two PLgel Olexis columns produced by Polymer Laboratories and one PLgel mixed-C column. All newly replaced columns were mixed bed-type columns. In addition, polystyrene (PS) was used as a GPC standard material for determination of molecular weight.

TABLE 1

| Items | | Examples | | Comparative Examples | |
|---|---|---|---|---|---|
| | | 1 | 2 | 1 | 2 |
| Samples | | A | B | C | D |
| n-butyllithium (mmol/h) | | 22.32 | 22.32 | 22.32 | |
| Polar additives (g/h) | a | 4.29 | — | 4.29 | |
| | b | — | 3.9 | — | — |

TABLE 1-continued

|  |  | Examples | | Comparative Examples | |
|---|---|---|---|---|---|
| Items | | 1 | 2 | 1 | 2 |
| Modifying agent (mmol/h) | c | 10.27 | 10.27 | — | — |
| Coupling agent (g/h) | d | — | — | 1.41 | — |
| Oil | Type | TDAE | TDAE | TDAE | RAE |
|  | phr | 37.9 | 37.3 | 37.2 | 37.5 |
| Mooney viscosity (MV) | | 70 | 73 | 82 | 53 |
| NMR (%) | SM | 36 | 35 | 34 | 36 |
|  | Vinyl | 28 | 25 | 26 | 26 |
| GPC (×10⁴) | Mn | 54 | 66 | 72 | 33 |
|  | Mw | 112 | 116 | 159 | 94 |
|  | PDI | 2.1 | 1.8 | 2.2 | 2.8 | a: 2,2-bis(2-oxolanyl)propane
b: N,N,N',N'-tetramethylethylenediamine
c: Bis(diethoxymethylsilylpropyl)-N-methlyamine
d: N,N,N',N'-tetraglycidyl-m-xylenediamine Samples A to D shown in Table 1 as rubber raw materials were mixed under mixing conditions shown in the following Table 2 to prepare conjugated diene polymer rubber compositions. The unit of the raw materials shown in Table 2 is phr with respect to 100 parts by weight of the rubber.

Specifically, a method for kneading the rubber compositions of the conjugated diene polymer will be described in detail. In primary kneading, a rubber raw material (conjugated diene polymer), a filler, an organosilane coupling agent, an oil, zinc oxide, a stearic acid antioxidant, an anti-aging agent, a wax and an accelerator were kneaded using a Banbury mixer equipped with a temperature controller. At this time, the temperature of the kneader was controlled and a primary mixture was obtained at a discharge temperature of 145 to 155° C. In secondary kneading, after the primary mixture was cooled to room temperature, a rubber, sulfur and a vulcanization accelerator were added to the kneader and then mixed at a temperature of 100° C. or less to obtain a secondary mixture. Finally, the secondary mixture was cured at 100° C. for 20 minutes to prepare a vulcanized rubber.

TABLE 2

| Types | Materials | Contents (unit: parts by weight) |
|---|---|---|
| Primary kneading | Rubber | 137.5 |
|  | Silica | 70.0 |
|  | Coupling agent | 11.2 |
|  | Oil | — |
|  | Zinc oxide | 3.0 |
|  | Stearic acid | 2.0 |
|  | Antioxidant | 2.0 |
|  | Anti-aging agent | 2.0 |
|  | Wax | 1.0 |
| Secondary kneading | Rubber accelerator | 1.75 |
|  | Sulfur | 1.5 |
|  | Vulcanization accelerator | 2.0 |
|  | Total weight | 233.95 |

Physical properties of the prepared vulcanized rubbers were measured in accordance with the following method.

1) Tensile Strength Test

Tensile strength at break and tensile stress at an elongation of 300% (300% modulus) of specimens were measured by tensile strength testing in accordance with ASTM 412.

2) Viscoelasticity

A dynamic mechanical analyzer produced by TA Instruments was used. Tan δ was measured while changing strain in a torsional mode at a frequency of 10 Hz and at different measurement temperatures of −60 to 60° C. Payne effect was represented as a difference between a minimum and a maximum at a strain of 0.28% to 40%. As Payne effect decreases, dispersibility of a filler such as silica is improved. As Tan δ at a low temperature of 0° C. increases, wet skid resistance is improved, and as Tan δ at a high temperature of 60° C. decreases, hysteresis loss decreases, and rolling resistance of tires decreases, that is, fuel consumption thereof is reduced. Physical properties of vulcanized rubber are shown in Table 3 below.

TABLE 3

| Items | Ex. 3 | Ex. 4 | Comp. Ex. 3 | Comp. Ex. 4 |
|---|---|---|---|---|
| Samples | A | B | C | D |
| 300% modulus (Kgf/cm²) | 136 | 126 | 122 | 120 |
| Tensile strength (Kgf/cm²) | 167 | 174 | 198 | 193 |
| Tan δ at 0° C. | 0.834 | 0.686 | 0.655 | 0.647 |
| Tan δ at 60° C. | 0.109 | 0.106 | 0.110 | 0.137 |
| ΔG' at 60° C. (Payne effect) | 0.46 | 0.43 | 0.51 | 0.54 |

As can be seen from results shown in Table 3 above, the modified conjugated diene polymer rubber compositions according to Examples 3 and 4 exhibited a great increase in 300% modulus (tensile stress) and tensile strength, and a high Tan δ at 0° C., as compared to Comparative Examples 3 and 4, which indicates that tires comprising the modified conjugated diene polymer rubber compositions exhibited great improvement of wet skid resistance.

In addition, the modified conjugated diene polymer rubber compositions of Examples 3 and 4 exhibited a low Tan δ at 60° C., as compared to Comparative Examples 3 and 4. Tires comprising the modified conjugated diene polymer rubber compositions exhibited low rolling resistance as compared to the related art.

In addition, the modified conjugated diene polymers according to Examples 3 and 4 exhibited a considerably low ΔG' at 60° C., as compared to Comparative Examples 3 and 4. From this result, it could be seen that dispersibility of silica was greatly improved.

What is claimed is:

1. A method for continuously preparing a modified conjugated diene polymer comprising:

(a) polymerizing at least one monomer selected from the group consisting of a conjugated diene monomer and an aromatic vinyl monomer using an organometallic compound in the presence of a solvent to prepare an active polymer having a metal end group; and (b) modifying the active polymer by adding, as a modifying agent, bis(diethoxymethylsilylpropyl)-N-methylamine to obtain the modified conjugated diene polymer represented by Formula 2 below:

[Formula 2]

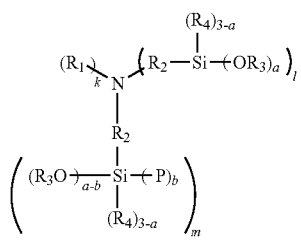

wherein $R_1$ is a methyl group, $R_2$ is a propylene group, $R_3$ is an ethyl group, $R_4$ is a methyl group, a is an integer of 2, k is an integer of 1, l is an integer of 0 or 1, m is an integer of 1 or 2, l+m satisfies 2, P is a conjugated diene polymer chain and b is an integer of 1 or 2, wherein the polymerization step (a) further comprises adding 2,2-bis(2-oxolanyl) propane as a polar additive, wherein the conjugated diene monomer is at least one selected from the group consisting of 1,3-butadiene, 2,3-dimethyl-1,3-butadiene, piperylene, 3-butyl-1,3-octadiene, isoprene, and 2-phenyl-1,3-butadiene, and wherein the aromatic vinyl monomer is at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

2. The method according to claim 1, wherein the organometallic compound is used in an amount of 0.01 to 10 mmol, based on total 100 g of the monomer.

3. The method according to claim 1, wherein a molar ratio of the organometallic compound to the modifying agent is 1:0.1 to 1:10.

4. The method according to claim 1, wherein the polar additive is added in an amount of 0.001 to 50 g, based on total 1 mmol of the organometallic compound.

5. The method according to claim 1, wherein the conjugated diene monomer is 1,3-butadiene and the aromatic vinyl monomer is styrene, and the modified conjugated diene polymer is a modified styrene-butadiene polymer.

* * * * *